United States Patent
Hotta et al.

(10) Patent No.: US 7,796,475 B2
(45) Date of Patent: Sep. 14, 2010

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 298 days.

(21) Appl. No.: 12/145,381

(22) Filed: Jun. 24, 2008

(65) Prior Publication Data

US 2008/0316903 A1    Dec. 25, 2008

(30) Foreign Application Priority Data

Jun. 25, 2007   (JP) ............................. 2007-165819

(51) Int. Cl.
G11B 7/00 (2006.01)
(52) U.S. Cl. .............................. 369/44.23; 369/112.22; 369/112.23; 369/112.08
(58) Field of Classification Search ........................ None
See application file for complete search history.

(56) References Cited

U.S. PATENT DOCUMENTS

| 7,330,419 | B2 * | 2/2008 | Nishino et al. | 369/112.08 |
| 7,512,055 | B2 * | 3/2009 | Hirayama et al. | 369/112.01 |
| 2006/0018237 | A1 * | 1/2006 | Sugi et al. | 369/112.23 |

FOREIGN PATENT DOCUMENTS

JP    2004-039161    2/2004

* cited by examiner

*Primary Examiner*—Muhammad N. Edun
(74) *Attorney, Agent, or Firm*—Fish & Richardson P.C.

(57) ABSTRACT

An optical pickup apparatus comprising: a collimating lens configured to convert laser light having Gaussian distribution property emitted from a laser diode from divergent light to parallel light; an objective lens configured to focus the laser light from the collimating lens onto a signal recording layer of an optical disc; and an adjustment film formed on a surface of an incident face of the collimating lens on which the laser light is incident, and configured to adjust transmittance of the laser light passing through the collimating lens, the adjustment film being formed on the surface of the incident face so that the transmittance is lower on the inner side of the incident face than on the outer side of the incident face.

10 Claims, 5 Drawing Sheets

OPTICAL PICKUP APPARATUS

CROSS-REFERENCE TO RELATED APPLICATION

This application claims the benefit of priority to Japanese Patent Application No. 2007-165819, filed Jun. 25, 2007, of which full contents are incorporated herein by reference.

BACKGROUND OF THE INVENTION

1. Field of the Invention

The present invention relates to an optical pickup apparatus executing a reading-out operation of a signal recorded in an optical disc or a recording operation of a signal in the optical disc.

2. Description of the Related Art

There has been widely available an optical disc device capable of executing the signal reading-out operation and signal recording operation by applying laser light emitted from an optical pickup apparatus to a signal recording layer of the optical disc.

While there are prevailing in general the optical disc devices using optical discs called CD or DVD, there have recently been developed the optical disc devices using optical discs whose recording density is improved, i.e. Blu-ray standard, etc.

Infrared light with a wavelength of 780 nm is used as the laser light executing the reading-out operation of the signal recorded in the CD standard optical disc, and red light with a wavelength of 650 nm is used as the laser light executing the reading-out operation of the signal recorded in the DVD standard optical disc.

Thickness of a protective layer provided on an upper face of the signal recording layer in the CD standard optical disc is 1.2 mm, and the numerical aperture of an objective lens used for the reading-out operation of the signal from this signal recording layer is specified at 0.45. The thickness of the protective layer provided on the upper face of the signal recording layer in the DVD standard optical disc is 0.6 mm and the numerical aperture of the objective lens used for the reading-out operation of the signal from this signal recording layer is specified at 0.6.

In contrast to such CD-standard and DVD-standard optical discs, laser light with a short wavelength, or blue-violet light with a wavelength of 405 nm, for example, is used as the laser light carrying out the reading-out operation of the signal recorded in the Blu-ray standard or HD DVD standard optical discs.

The thickness of the protective layer provided on the upper face of the signal recording layer in the Blu-ray standard optical disc is 0.1 mm, and the numerical aperture of the objective lens used for the reading-out operation of the signal from this signal recording layer is specified at 0.85.

For a reproduction operation of the signal recorded in the signal recording layer included in the Blu-ray standard optical disc or for a recording operation of the signal in the signal recording layer, a diameter of a laser spot generated by focusing laser light needs to be reduced. In the objective lens used to obtain the desired laser spot shape, not only the numerical aperture (NA) thereof is increased but a focal length thereof becomes shorter and, therefore, a radius of curvature of the objective lens becomes smaller.

In the optical pickup apparatus, a laser diode is used as an element for generating the laser light to be emitted, but intensity of the laser light emitted from the laser diode is not uniform and has a property called the Gaussian distribution. The intensity distribution of such a laser light is in an elliptical shape as known in the laser diode.

In the optical pickup apparatus using the objective lens having the small radius of curvature, since the elliptical laser light emitted from the laser diode enters the objective lens, there is decreased rim intensity, i.e., the intensity of the laser light passing through a peripheral portion of the objective lens relative to the intensity of the laser light passing through in the vicinity of an optical axis thereof. As a result, there exists a problem not only that the peripheral portion of the laser spot is blurred but that a focusing intensity is decreased.

In the case of a lens having a small radius of curvature and a large numerical aperture such as the objective lens as mentioned above, an incident angle of the laser light is increased on the peripheral side of the objective lens, i.e., at a position where the numerical aperture is large, thereby increasing reflectance, so that the above-mentioned rim intensity decreases due to the above properties.

There is proposed a method of forming an antireflective film on the objective lens as a method for solving such a problem to obtain a desired laser spot (See Japanese Patent Application Laid-Open Publication No. 2004-39161).

In the above Patent Document, there is described an art for minimizing reflectance at a predetermined position by the antireflective film provided on an objective lens. Although the rim intensity can be improved with such an art, it can be applied only when the intensity is uniform of the laser beam entering an entrance pupil of the objective lens.

The objective lens is made up so as to be displaced in a radial direction of the optical disc under a tracking control operation, as is well known. Therefore, the intensity becomes nonuniform of the laser beam entering the entrance pupil of the objective lens due to displacement of the objective lens under the tracking control operation.

FIGS. 5A and 5B show a relation between an entrance pupil S and light intensity on the objective lens in the optical pickup apparatus. FIG. 5A shows a case where the objective lens is at a neutral position, that is, a position where the objective lens is not displaced by the tracking control operation, and FIG. 5B shows a case where the objective lens is at a position where the objective lens is displaced in a tracking direction by the tracking control operation.

In FIGS. 5A and 5B, a range e represented by dots shows a portion in which the light intensity is low. FIG. 5A shows, as mentioned above, a case where the objective lens is at the neutral position, and if the light intensity on the entrance pupil S of the objective lens is not uniform, when the objective lens is displaced in the tracking direction, the light intensity on the entrance pupil S of the objective lens becomes greatly nonuniform in the tracking direction as shown in FIG. 5B.

If the intensity in the tracking direction of the laser beam entering the entrance pupil becomes nonuniform as the objective lens is displaced in the tracking direction, the rim intensity in the tracking direction decreases, so that the shape of a spot of the laser beam focused to be formed on the signal recording layer of the optical disc becomes larger. As a result, there are problems that reproduction characteristics of the signal recorded in the optical disc and recording characteristics of the signal in the optical disc are deteriorated.

SUMMARY OF THE INVENTION

An optical pickup apparatus according to an aspect of the present invention, comprises: a collimating lens configured to convert laser light having Gaussian distribution property emitted from a laser diode from divergent light to parallel light; an objective lens configured to focus the laser light from the collimating lens onto a signal recording layer of an optical disc; and an adjustment film formed on a surface of an incident face of the collimating lens on which the laser light is incident, and configured to adjust transmittance of the laser light passing through the collimating lens, the adjustment film being formed on the surface of the incident face so that the transmittance is lower on the inner side of the incident face than on the outer side of the incident face.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

In an optical pickup apparatus according to an embodiment of the present invention, a transmittance control film for setting transmittance of a laser beam is provided on a surface of a collimating lens which the laser beam emitted from a laser diode enters as divergent light and converts the laser beam into parallel light so that light-intensity distribution on an entrance pupil of an objective lens is made uniform by the transmittance control film, and thus rim intensity can be prevented from decreasing. Therefore, a shape of a spot generated on a signal recording layer of an optical disc by a light-focusing operation of the objective lens can be prevented from becoming larger, and thus there can be improved reproduction characteristics of reproducing a signal recorded in an optical disc and recording characteristics of recording a signal in the optical disc.

In an optical pickup apparatus according to an embodiment of the present invention, since the transmittance is set so as to correct Gaussian distribution property of the laser beam, the light intensity distribution on the entrance pupil of the objective lens can be optimized.

In an optical pickup apparatus according to an embodiment of the present invention, since a transmittance control film is provided in a single layer (a single-layer film), a coating operation of the transmittance control film can easily be carried out on a collimating lens.

In an optical pickup apparatus according to an embodiment of the present invention, since the transmittance control film is provided in a plurality of layers (a multiple-layer film), a film with a desired transmittance distribution can easily be formed by using films which are different in transmittance.

In an optical pickup apparatus according to an embodiment of the present invention, since the light intensity distribution on the entrance pupil of the objective lens is made uniform in such a range where the objective lens is displaced under a tracking control operation, there can be improved the signal reproduction characteristics and the signal recording characteristics.

Figure 1:
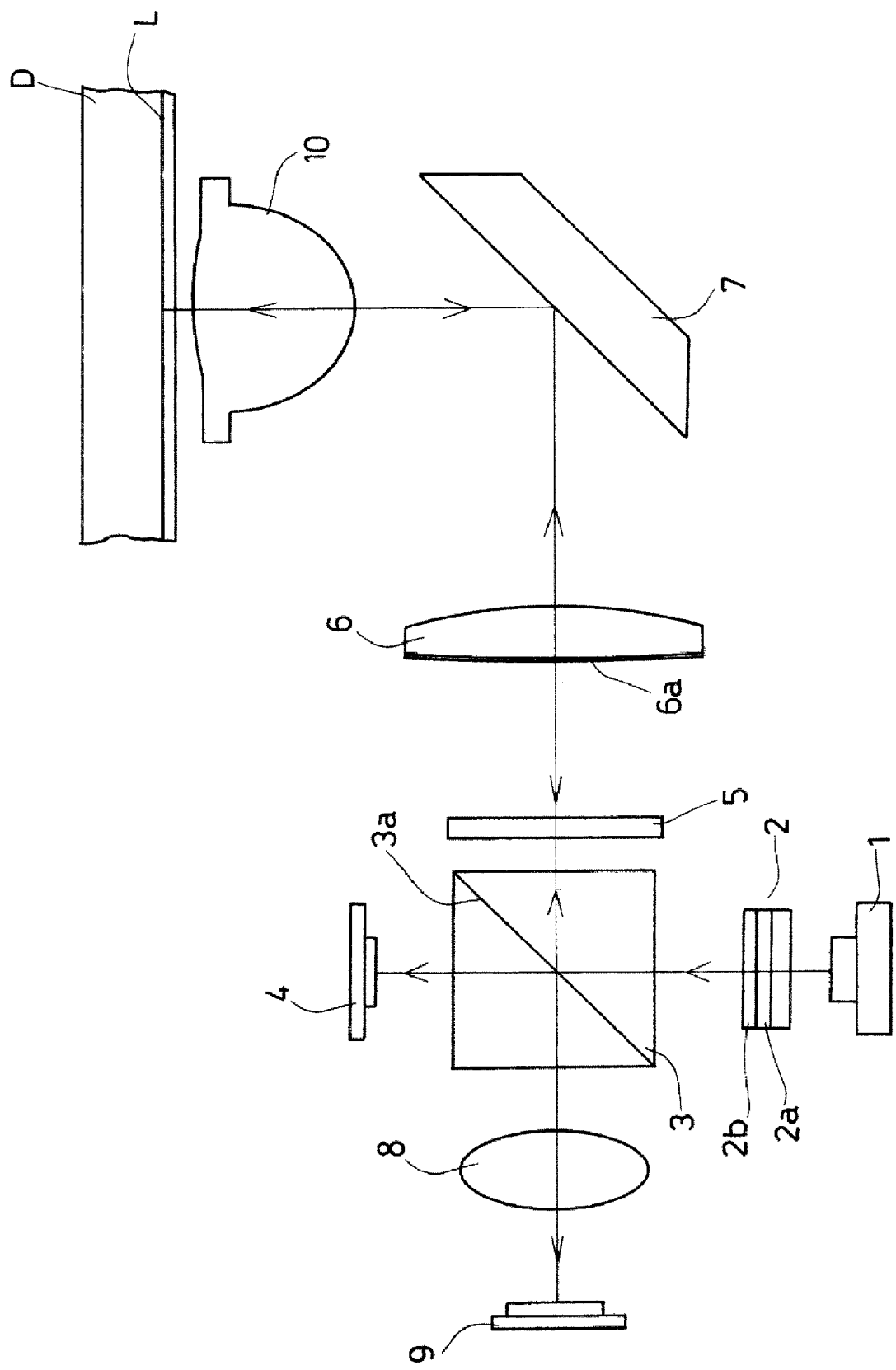
FIG. 1 is a schematic diagram illustrating an optical pickup apparatus according to an embodiment of the present invention.

In FIG. 1, reference numeral 1 denotes a laser diode emitting laser light which is blue-violet light with a wavelength of 405 nm, for example, and the laser light to be emitted as described above has the Gaussian distribution property. Reference numeral 2 is a diffraction grating which the laser light emitted from the laser diode 1 enters and which includes a diffraction grating portion 2a for splitting the laser light into the 0th-order light, +1st-order light and −1st-order light, and a half-wave plate 2b for converting the incident laser light into linear polarized light in an S direction.

Reference numeral 3 denotes a polarization beam splitter which the laser light having passed through the diffraction grating 2 enters and which includes a control film 3a reflecting S-polarized laser light and allowing the laser light polarized in a P direction to pass therethrough. Reference numeral 4 denotes a photodetector for monitoring provided at a position where the laser light having passed through the polarization beam splitter 3 in the laser light emitted from the laser diode 1 is applied, and detection output of the photodetector is used for controlling output of the laser light emitted from the laser diode 1.

Reference numeral 5 is a quarter-wave plate is provided at a position where the laser light reflected from the control film 3a of the polarization beam splitter 3 enters and converts the incident laser light from linear polarized light into circular polarization light. Reference numeral 6 denotes a collimating lens which the laser light having passed through the quarter-wave plate 5 enters as divergent light, and which converts the incident laser light into parallel light and corrects spherical aberration due to a protective layer of a Blu-ray standard optical disc D.

In the collimating lens 6, there is formed a transmittance control film 6a for setting transmittance of the laser beam passing through the collimating lens 6. Details of the transmittance control film 6a will be described later.

Reference numeral 7 is a reflecting mirror that the laser light having been converted into the parallel light at the collimating lens 6 is applied to, and reflects the laser light in a direction of a signal face of the optical disc D, and that return light reflected from a signal recording layer L of the optical disc D is applied thereto and reflects the return light in a direction of the polarization beam splitter 3, as will be described later.

Reference numeral 8 is a sensor lens which the return light having passed through the control film 3a included in the polarization beam splitter 3 enters and which includes a cylindrical face, a flat face, a concave curved face or a convex curved face and the like formed on the side of the incident face and the emitting face of the sensor lens. Such sensor lens 8 is provided for generating a focus error signal used for a focusing control operation by generating astigmatism in the return light.

Reference numeral 9 is a photodetector provided at a position where the return light having passed through the sensor lens 8 is focused and applied and made up of a four-divided sensor and the like in which photodiodes are disposed. Configuration of such photodetector 9 and generating operation of the focus error signal by astigmatism and the like are well-known and the description thereof is omitted.

Reference numeral 10 is an objective lens which the laser light reflected from the reflecting mirror 7 enters and which focuses the incident laser light onto the signal recording layer L included in the optical disc D. A radius of curvature of the objective lens is made small, unlike that of a spherical face. The objective lens 10 is fixed to a lens holder by four support wires, for example, so as to be capable of performing a displacement operation in a direction perpendicular to the signal face of the optical disc, i.e., a focusing direction as well as a displacement operation in a radial direction of the optical disc, i.e., the tracking direction.

When performing the reproduction operation of a signal recorded in the optical disc D, a driving current is supplied to the laser diode 1, so that laser light with a wavelength of 405 nm is emitted from the laser diode 1. The laser light emitted from the laser diode 1 enters the diffraction grating 2, to be split by the diffraction grating portion 2a making up the diffraction grating 2 into the 0th-order light, +1st-order light, and −1st-order light, and converted by the half-wave plate 2b into the linear polarized light in the S direction. The laser light having passed through the diffraction grating 2 enters the polarization beam splitter 3 to be reflected from the control film 3a included in the polarization beam splitter 3, while a portion of the laser light passes through the control film 3a to be applied to the photodetector 4 for monitoring.

The laser light reflected from the control film 3a enters the collimating lens 6 through the quarter-wave plate 5 to be converted by the collimating lens 6 into the parallel light. The laser light converted by the collimating lens 6 into the parallel light is reflected from the reflecting mirror 7, and then enters the objective lens 10. The laser light entering the objective lens 10 is applied to the signal recording layer L of the optical disc D as a spot by a focusing operation of the objective lens 10. While the laser light emitted from the laser diode 1 is applied as a desired spot onto the signal recording layer L of the optical disc D as above, the numerical aperture of the objective lens 10 is set at 0.85 in this case.

When performing the above-mentioned focusing operation of the laser light by the objective lens 10, spherical aberration is generated due to difference in thickness of the protective layer between the signal recording layer L and the signal incident face of the optical disc D. However, adjustment can be made so as to minimize the spherical aberration by displacing the collimating lens 6 shown in an embodiment according to the present invention in a direction of an optical path.

While an irradiation operation of the laser light onto the signal recording layer L included in the optical disc D is carried out by the above-mentioned operation, when such an irradiation operation is performed, the return light reflected from the signal recording layer L enters the objective lens 10 from a side of the optical disc D. The return light entering the objective lens 10 enters the polarization beam splitter 3 through the reflecting mirror 7, the collimating lens 6, and the quarter-wave plate 5. Since the return light entering the polarization beam splitter 3 has been converted into the linear polarized light in the P direction, it passes through the control film 3a included in the polarization beam splitter 3.

The return light of the laser light having passed through the control film 3a enters the sensor lens 8, and astigmatism is generated by the sensor lens 8. The return light in which the astigmatism is generated by the sensor lens 8 is applied to a sensor portion such as a four-divided sensor included in the photodetector 9 by the focusing operation of the sensor lens 8. As a result of irradiation of the return light to the photodetector 9 as above, a generating operation of a focus error signal is carried out with the use of change in shape of a spot obtained by irradiating the sensor portion included in the photodetector 9 with the return light, as is well known. The focusing control operation can be performed by displacing the objective lens 10 in a direction of a signal face of the optical disc D using such a focus error signal.

Although not described in this embodiment, a well-known tracking control operation using the +1st-order light and the −1st-order light generated by the diffraction grating 2 can be executed, and a reading-out operation of a signal recorded in the optical disc D can be performed by displacing the objective lens 10 in the tracking direction by such tracking control operation.

The reading-out operation of the signal recorded in the optical disc D is carried out as mentioned above. While such reading-out operation is performed, a portion of the laser light is applied to the photodetector 4 for monitoring, thereby controlling a driving current value to be supplied to the laser diode 1 with using a level change in a monitor signal obtained from the photodetector 4 for monitoring.

Since output of the laser light can be controlled by controlling the driving current value supplied to the laser diode 1, there can be executed not only the reproduction operation of the signal recorded in the optical disc D but also an adjustment operation of the laser output required when recording a signal in the optical disc D.

The operation of signal-reproduction and the like in the optical pickup apparatus configured as shown in FIG. 1 are carried out as described above, and the transmittance control film 6a, which is the gist of an embodiment according to the present invention, will be described below.

The transmittance control film 6a is formed of a single layer of magnesium fluoride, for example, on a surface of a side of an incident face (a face that the laser light is incident on) of the collimating lens 6, and the transmittance control film 6a is made up so as to adjust intensity of the laser light passing through the collimating lens 6 by adjusting and controlling reflectance of the laser light reflected from the transmittance control film.

Figure 3:
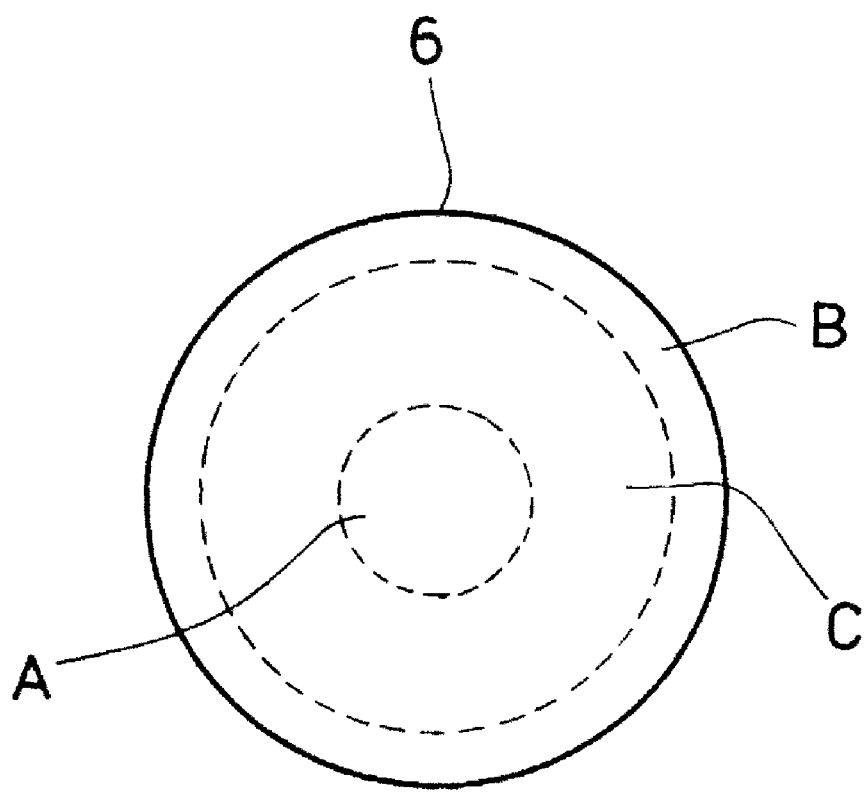
FIG. 3 is a plan view illustrating transmittance distribution in the collimating lens according to an embodiment of the present invention.

FIG. 3 shows a transmittance distribution set in the transmittance control film 6a formed on the surface of the incident face side of the collimating lens 6, and the transmittance in the center part of the incident face of the collimating lens 6 is set smaller than that in the outer part thereof.

In the same figure, the transmittance of the center part represented by A is the smallest, while the transmittance of the outer part represented by B is the largest, and the transmittance of the intermediate part represented by C is set to become larger than A and smaller than B. The transmittance set by the transmittance control film 6a is set so as to be a value for correcting the Gaussian distribution property of the laser light emitted from the laser diode 1, for example.

Figure 2:
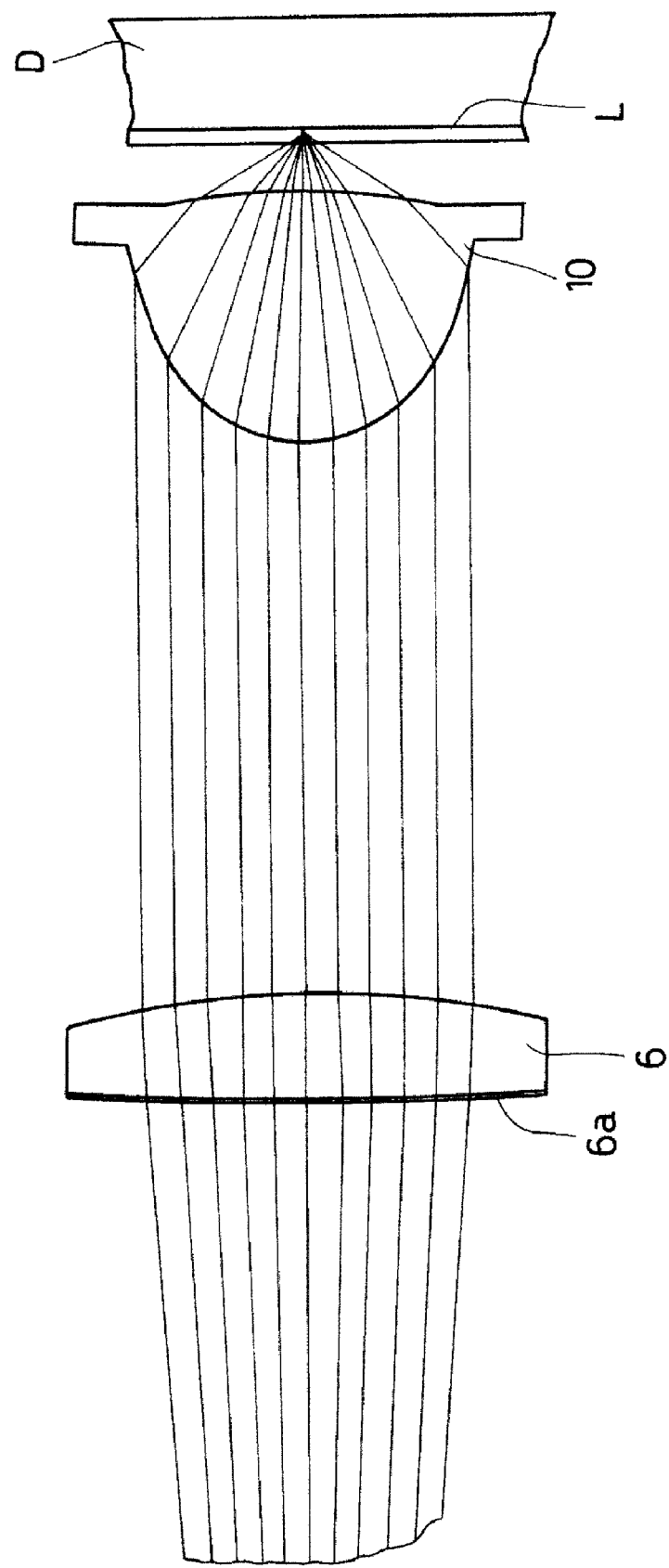
FIG. 2 is a light beam diagram illustrating a relation between a collimating lens and an objective lens according to an embodiment of the present invention.

FIG. 2 is a light beam diagram illustrating a relation between the objective lens 10 and the collimating lens 6 converting the laser light, which is incident divergent light, into parallel light. As is obvious form the figure, the laser light having been converted into the parallel light in the collimating lens 6 is emitted to the objective lens 10 and focused onto the signal recording layer L included in the optical disc D by the focusing operation of the objective lens 10.

The laser light is focused onto the signal recording layer L by the focusing operation of the objective lens 10 so as to form a spot as described above, and a range of the incident face of the objective lens 10 which functions so as to form the spot is an entrance pupil in the objective lens 10.

Figure 4A:
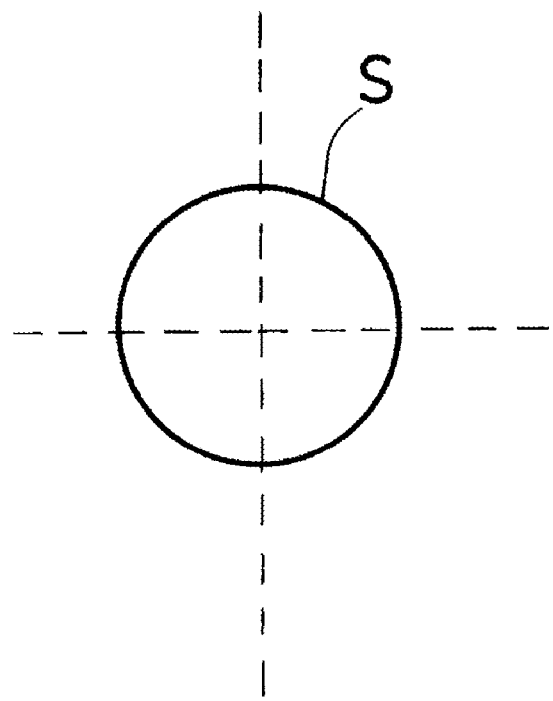
FIGS. 4A and 4B are diagrams illustrating a relation between an entrance pupil of an objective lens and light intensity according to an embodiment of the present invention.
Figure 4B:
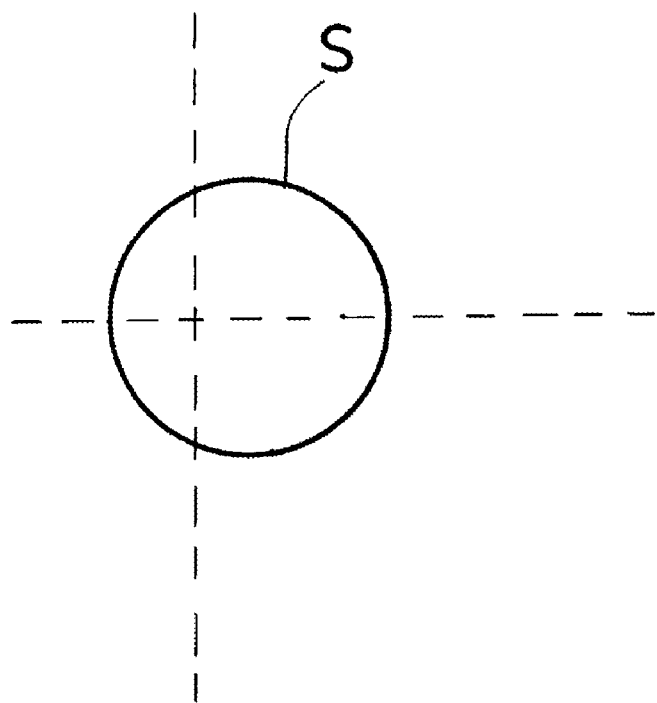
Figure 5A:
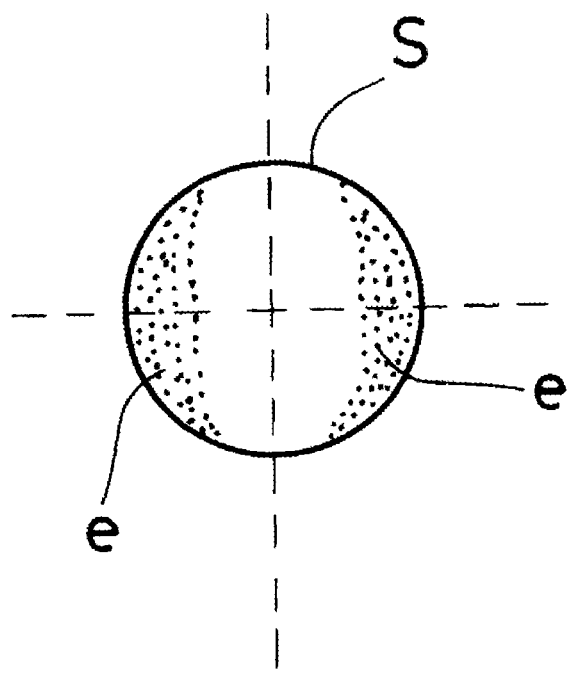
FIGS. 5A and 5B are diagrams illustrating a relation between an entrance pupil of an objective lens and light intensity according to an optical pickup apparatus.
Figure 5B:
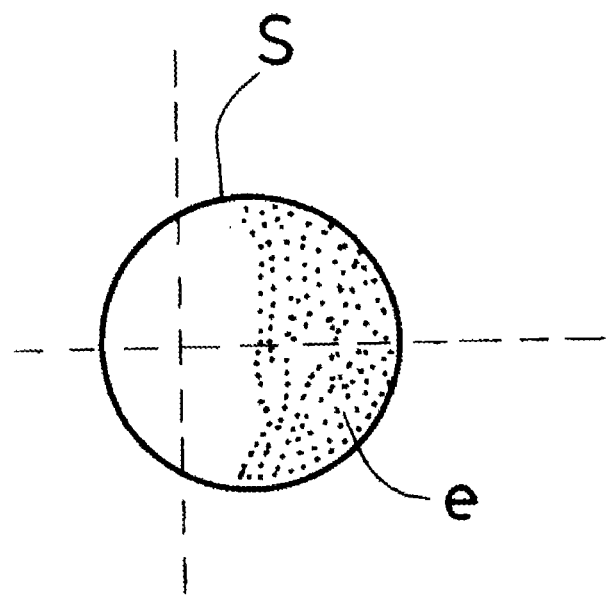

FIG. 4 shows a relation between the entrance pupil S on the objective lens in the optical pickup apparatus according to an embodiment of the present invention and the light intensity, in which FIG. 4A shows a case where the objective lens 10 is at a neutral position, that is, a position at which the objective lens 10 is not displaced by the tracking control operation, and FIG. 4B shows a case at a position in which the objective lens 10 is displaced in the tracking direction by the tracking control operation.

As is obvious from FIGS. 4A and 4B, in the optical pickup apparatus according to an embodiment of the present invention, even if the laser light entering the collimating lens 6 is different in intensity between on the center axis side of the incident face of the lens and on the outer side thereof due to the Gaussian property, since the transmittance is adjusted by the transmittance control film 6a formed on the surface of the collimating lens 6, intensity of the laser light passing through the collimating lens 6, that is, the light having been converted into the parallel light can be made uniform in a wide range.

Since the laser light having the intensity made uniform in a wide range enters the objective lens 10, when the objective lens 10 is at the neutral position or even if the objective lens 10 is displaced in the tracking direction, the light intensity on the entrance pupil S of the objective lens can be made uniform.

Therefore, in the optical pickup apparatus of an embodiment according to the present invention, even if the objective lens 10 is displaced in the tracking direction, the intensity of the light entering the entrance pupil can be made uniform, and as a result, the rim intensity in the tracking direction is not decreased so that the shape of a spot formed by focusing the laser light on the signal recording layer L of the optical disc D can be made small. Thus, there can be improved the reproduction characteristics of a signal recorded in the optical disc D and the recording characteristics of a signal in the optical disc.

In an embodiment according to the present invention, while the transmittance distribution of the transmittance control film 6a formed on the surface of the collimating lens 6 is divided into three parts of A, B, and C as shown in FIG. 3, the transmittance may be fixed in each divided part or the transmittance of the part C may be set so as to be changed continuously from the center part to the outer part. That is, the transmittance control film 6a is formed so that the transmittance is lower on the inner side of the incident face of the collimating lens than on the outer side of the incident face.

Also, the intensity distribution of the parallel light that is the laser light having passed through the collimating lens, can be made uniform by measuring the intensity distribution of the laser light entering the collimating lens 6 and correcting the transmittance distribution of the transmittance control film 6a so as to correct the measured intensity distribution.

While the transmittance control film 6a formed on the surface of the collimating lens 6 may be made up of a single layer, a method of adjusting the transmittance of the laser light includes a method of changing in thickness or material of the transmittance control film. Also, the transmittance control film 6a may be made up not of a single layer but of a plurality of layers, that is, by multi-coating.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
a collimating lens configured to convert laser light having Gaussian distribution property emitted from a laser diode from divergent light to parallel light;
an objective lens configured to focus the laser light from the collimating lens onto a signal recording layer of an optical disc; and
an adjustment film formed on a surface of an incident face of the collimating lens on which the laser light is incident, and configured to adjust transmittance of the laser light passing through the collimating lens,
the adjustment film being formed on the surface of the incident face so that the transmittance is lower on the inner side of the incident face than on the outer side of the incident face.

2. The optical pickup apparatus of claim 1, wherein the adjustment film is formed on the surface of the incident face so that light intensity distribution on an entrance pupil of the objective lens is uniform.

3. The optical pickup apparatus of claim 2, wherein the adjustment film is formed on the surface of the incident face so that the light intensity distribution on the entrance pupil is uniform in a range where the objective lens is displaced in a tracking direction.

4. The optical pickup apparatus of claim 1, wherein the incident face includes an outer part, a center part, and an intermediate part between the outer part and the center part; and
transmittance of the adjustment film decreases in an order of the outer part, the intermediate part, and the center part.

5. The optical pickup apparatus of claim 4, wherein the transmittance of the adjustment film is constant in each of the outer part, the intermediate part, and the center part.

6. The optical pickup apparatus of claim 4, wherein the transmittance of the adjustment film is continuously changed in the intermediate part.

7. The optical pickup apparatus of claim 1, wherein the adjustment film is a single-layer film.

8. The optical pickup apparatus of claim 7, wherein the adjustment film is made of magnesium fluoride.

9. The optical pickup apparatus of claim 7, wherein the adjustment film is different in film thickness between on the inner side of the incident face and on the outer side of the incident face.

10. The optical pickup apparatus of claim 1, wherein the adjustment film is a multiple-layer film.

* * * * *